US008442747B2

(12) United States Patent
Ma et al.

(10) Patent No.: US 8,442,747 B2
(45) Date of Patent: May 14, 2013

(54) CYLINDER AIR MASS PREDICTION SYSTEMS FOR STOP-START AND HYBRID ELECTRIC VEHICLES

(75) Inventors: Qi Ma, Farmington Hills, MI (US); Robert Douglas Shafto, New Hudson, MI (US)

(73) Assignee: GM Global Technology Operations LLC

( * ) Notice: Subject to any disclaimer, the term of this patent is extended or adjusted under 35 U.S.C. 154(b) by 308 days.

(21) Appl. No.: 12/835,830

(22) Filed: Jul. 14, 2010

(65) Prior Publication Data

US 2011/0295483 A1   Dec. 1, 2011

Related U.S. Application Data

(60) Provisional application No. 61/350,110, filed on Jun. 1, 2010.

(51) Int. Cl.
*F02D 41/06* (2006.01)
*F02D 41/18* (2006.01)

(52) U.S. Cl.
USPC ........... 701/112; 701/113; 123/673; 123/674; 123/179.4; 73/114.32

(58) Field of Classification Search .................. 701/102, 701/112, 113; 123/179.4, 673, 674; 73/114.32
See application file for complete search history.

(56) References Cited

U.S. PATENT DOCUMENTS

| | | | |
|---|---|---|---|
| 4,958,516 A * | 9/1990 | Stiles et al. | 73/114.32 |
| 6,275,759 B1 | 8/2001 | Nakajima et al. | 701/54 |
| 6,758,190 B2 | 7/2004 | Denz et al. | 123/350 |
| 7,079,935 B2 * | 7/2006 | Lewis et al. | 701/102 |
| 7,130,731 B2 | 10/2006 | Itoh et al. | 701/54 |
| 8,099,203 B2 | 1/2012 | Miller et al. | 701/22 |
| 8,157,035 B2 | 4/2012 | Whitney et al. | 180/65.265 |
| 2006/0048734 A1 * | 3/2006 | Kataoka et al. | 123/179.4 |
| 2007/0163531 A1 * | 7/2007 | Lewis et al. | 123/179.4 |
| 2008/0275624 A1 * | 11/2008 | Snyder | 701/104 |
| 2009/0066337 A1 * | 3/2009 | Gibson et al. | 324/378 |
| 2010/0211299 A1 * | 8/2010 | Lewis et al. | 701/113 |
| 2012/0245831 A1 * | 9/2012 | Patterson et al. | 701/113 |

OTHER PUBLICATIONS

U.S. Appl. No. 12/835,835, filed Jul. 14, 2010, Qi Ma et al.
U.S. Appl. No. 12/835,842, filed Jul. 14, 2010, Qi Ma et al.
U.S. Appl. No. 12/835,848, filed Jul. 14, 2010, Qi Ma et al.
U.S. Appl. No. 12/835,856, filed Jul. 14, 2010, Qi Ma et al.
U.S. Appl. No. 12/835,942, filed Jul. 14, 2010, Qi Ma et al.

(Continued)

*Primary Examiner* — Erick Solis

(57) ABSTRACT

An engine system includes a first module that determines a cylinder of an engine to be in one of M prediction types and generates a distance from intake signal indicating a number of prediction steps the cylinder is away from an intake stroke. M is an integer greater than or equal to 3. A second module determines a cycle type of the cylinder. The cycle type indicates a number of combustion cycles the cylinder has experienced from a last restart of the engine. A cylinder air charge module estimates an air mass within the cylinder based on the distance from intake signal and the cycle type.

22 Claims, 7 Drawing Sheets

OTHER PUBLICATIONS

U.S. Appl. No. 12/835,951, filed Jul. 14, 2010, Qi Ma et al.

Ohata et al., "Benchmark Problem for Automotive Engine Control", SICE Annual Conference, Sep. 2007, pp. 1723-1726.

Rokusho et al., "Combined Feedforward and Feedback Control for Start-Up Engine Control", 27th Chinese Control Conference, Jul. 2008, pp. 562-565.

Zhang et al., "Model-Based Cold-Start Speed Control Design for SI Engines", Proceedings of the 17th World Congress of the International Federation of Automatic Control, Jul. 2008, pp. 1042-1047.

Saerens et al., "Minimization of the Fuel Consumption of a Gasoline Engine Using Dynamic Optimization", Applied Energy, vol. 86 Iss. 9, Sep. 2009, pp. 1582-1588.

* cited by examiner

CYLINDER AIR MASS PREDICTION SYSTEMS FOR STOP-START AND HYBRID ELECTRIC VEHICLES

CROSS-REFERENCE TO RELATED APPLICATIONS

This application claims the benefit of U.S. Provisional Application No. 61/350,110, filed on Jun. 1, 2010. The disclosure of the above application is incorporated herein by reference in its entirety.

This application is related to U.S. patent application Ser. No. 12/835,835 filed on Jul. 14, 2010, Ser. No. 12/835,842 filed on Jul. 14, 2010, Ser. No. 12/835,848 filed on Jul. 14, 2010, Ser. No. 12/835,856 filed on Jul. 14, 2010, Ser. No. 12/835,942 filed on Jul. 14, 2010, and Ser. No. 12/835,951 filed on Jul. 14, 2010. The disclosures of the above applications are incorporated herein by reference in their entirety.

FIELD

The present disclosure relates to hybrid electric vehicles and stop-start engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A stop-start vehicle and a hybrid electric vehicle (HEV) may each include an internal combustion engine (ICE), one or more electric motors and a control module. The stop-start vehicle and the HEV may shut down (deactivate) an ICE, for example, to reduce the amount of time the ICE is idling. This improves fuel economy and reduces emissions. The ICE may be shut down when vehicle speed is less than a threshold.

In a stop-start system and in a HEV system an ICE may be shut down and/or transitioned to an at rest state (i.e. engine speed is equal to 0 revolutions/second). The ICE may be automatically started, for example, when an accelerator pedal is actuated.

SUMMARY

An engine system includes a first module that determines a cylinder of an engine to be in one of M prediction types and generates a distance from intake signal indicating a number of prediction steps the cylinder is away from an intake stroke. M is an integer greater than or equal to 3. A second module determines a cycle type of the cylinder. The cycle type indicates a number of combustion cycles the cylinder has experienced from a last restart of the engine. A cylinder air charge module estimates an air mass within the cylinder based on the distance from intake signal and the cycle type.

In other features, an engine system includes an engine timer that determines an amount of time that an engine is in a stalled state. A first position module determines a position of at least one of a crankshaft and a camshaft of an engine and generates a first position signal. A second position module estimates a position of a piston within a cylinder of an engine and generates a second position signal. A trapped air charge module determines a trapped air mass within the cylinder based on the amount of time, the first position signal and the second position signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
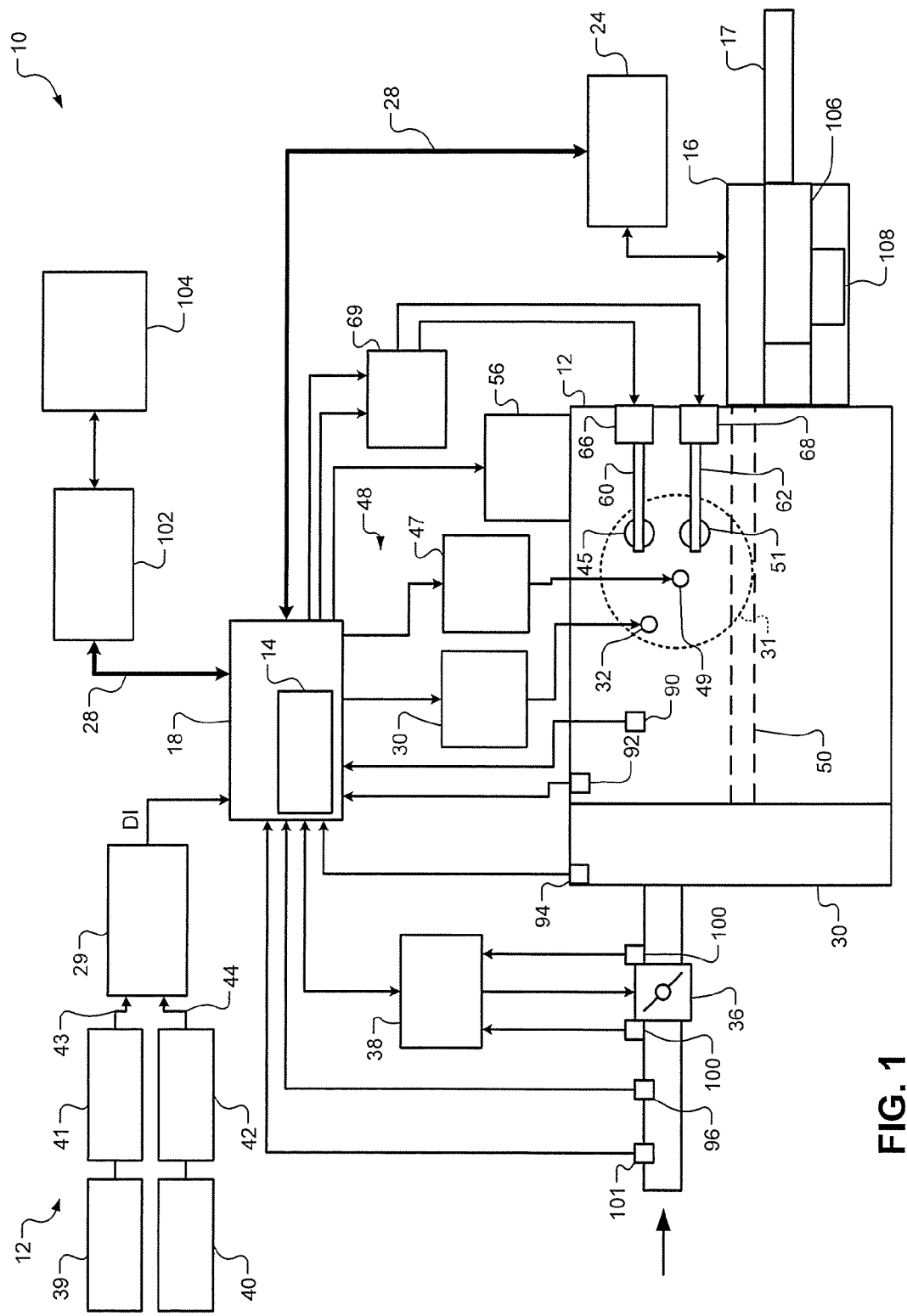
FIG. 1 is a functional block diagram of an engine system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In FIG. 1, an exemplary engine system 10 and corresponding stop-start control system 12 are shown. The engine system 10 includes an internal combustion engine (ICE) 14 and a transmission system 16. The ICE 14 has a corresponding engine control module (ECM) 18. The stop-start control system 12 includes the ECM 18, which has an air charge module 22. The ECM 18 shuts down and starts the ICE 14 when certain conditions are satisfied to conserve fuel and provide a requested amount of torque output. Example conditions are described below.

The engine system 10 and the stop-start control system 12 operate in an auto-stop mode, a trapped air charge adjustment mode and an auto-start mode. During the auto-stop mode, speed of the ICE 14 is decreased and fuel and spark of the ICE 14 are deactivated. During the auto-stop mode, the ICE 14 is stalled, such that the ICE 14 is shut down and speed of the ICE 14 is equal to 0 revolutions/second (rev/s). The speed of the ICE 14 is equal to 0 rev/s when, for example, the crankshaft of the ICE 14 is not rotating. The ICE 14 may be considered shut down (deactivated) when fuel (or fuel system) and spark (or ignition system) are deactivated. The speed of the ICE 14 may, for example, be ramped down from a current speed to 0 rev/s during the auto-stop mode.

During the trapped air charge adjustment mode, the ICE 14 is stalled and the air charge module 22 is tracking and/or estimating air mass(es) within the cylinders of the ICE 14. During the auto-start mode the ICE 14 may be cranked and speed of the ICE 14 may be increased to an idle speed. Fuel and spark are activated during the auto-start mode.

The air charge module 22 tracks the air mass (air charge) within each cylinder of the ICE 14. This includes tracking the air charges during the auto-stop, trapped air charge adjustment, and auto-start modes. During the auto-stop, trapped air charge adjustment, and auto-start modes, the air charge module 22 determines and adjusts estimates of trapped air charges within one or more of the cylinders. The ECM 18 may activate fuel and spark in the cylinders with trapped air upon startup of the ICE 14.

A trapped air charge may refer to a partial air charge or a full air charge that is contained within a cylinder of the ICE 14. A full air charge refers to air mass within a cylinder after a complete intake stroke. A partial air charge refers to air mass within a cylinder after the ICE is stalled. A trapped (seized) air charge within a cylinder decreases over time due to leakage; hence a trapped air charge may transition from a full air charge to a partial air charge. The amount of trapped air in each of the cylinders settles to an equilibrium level when the ICE 14 is stalled and after a certain period of time.

The ECM 18 may adjust fuel and spark parameters for each of the cylinders based on the corresponding air masses within each of the cylinders. The fuel parameters may include, for example, fuel injection quantity, fuel injection pressure, fuel injection timing, etc. The spark parameters may include, for example, spark energy and spark timing. The air masses of each of the cylinders is estimated for a current cylinder event and/or predicted for a subsequent cylinder event based on various parameters described below. The air mass of each cylinder may be estimated and/or predicted using different parameters depending on the operating mode.

While a spark ignition type engine is described herein, the present disclosure is applicable to other types of torque producers, such as gasoline type engines, gaseous fuel type engines, diesel type engines, propane type engines, and hybrid type engines. The transmission system 16 has a corresponding transmission control module (TCM) 24. The ECM 18 and the TCM 24 may communicate with each other via serial and/or parallel connections and/or via a control area network (CAN) 28.

The ICE 14 combusts an air/fuel mixture to produce drive torque for a vehicle based on information from a driver input module 29 (e.g., driver input signal DI) and other information described below. In operation, air is drawn into an intake manifold 30 of the ICE 14 through a throttle valve 36. The ECM 18 commands a throttle actuator module 38 to regulate opening of the throttle valve 36 to control the amount of air drawn into the intake manifold 30 based on, for example, information from the driver input module 29. The ECM 18 commands a fuel actuator module 31 to control the amount of fuel injected into the intake manifold 30, intake runner, and/or a cylinder 32, via for example a fuel injector 33.

The driver input module 29 may be or receive signals from, for example, sensors of a brake actuator 39 (e.g., brake pedal) and/or an accelerator 40 (e.g., accelerator pedal). The sensors may include a brake sensor 41 and an accelerator sensor 42. The driver input signal DI may include a brake pedal signal BRAKE 43 and an accelerator pedal signal ACCEL 44. Air from the intake manifold 30 is drawn into cylinders of the ICE 14 through an intake valve 45. While the ICE 14 may include multiple cylinders, for illustration purposes, the single representative cylinder 32 is shown.

The ECM 18 controls the amount of fuel injected into the intake manifold 30 and/or the cylinder 32. The injected fuel mixes with the air and creates the air/fuel mixture in the cylinder 32. A piston (not shown) within the cylinder 32 compresses the air/fuel mixture. Based upon a signal from the ECM 18, a spark actuator module 47 of an ignition system 48 energizes a spark plug 49 in the cylinder 32, which ignites the air/fuel mixture.

The combustion of the air/fuel mixture drives the piston down, thereby driving a rotating crankshaft 50. The piston then begins moving up again and expels the byproducts of combustion through an exhaust valve 51. The byproducts of combustion are exhausted from the vehicle via the exhaust system. The ICE 14 may be a 4-stroke engine where the piston is cycled iteratively through intake, compression, power/expansion and compression strokes.

The intake and exhaust valves 45, 51 may be controlled by a cylinder actuator module 56 via respective camshafts 60, 62 and cam phasers 66, 68. The cam phasers 66, 68 are controlled via a phaser actuator module 69.

The engine system 10 may measure the speed of the crankshaft 50 (engine speed) in revolutions per minute (RPM) using one or more engine position and/or speed sensor(s) 90. The engine position and/or speed sensors 90 may be uni-directional or bi-directional sensors. Uni-directional sensors detect rotation in a single direction. Bi-directional sensors detect rotation in two directions. Bi-directional sensors may be used to detect, for example, "rock back" of the ICE 14. Rock back refers to when the crankshaft of the engine rotates in a reverse direction due to, for example, a balance between piston and friction forces of the engine and/or due to cylinder pressures. Temperature of the ICE 14 may be measured using an engine coolant or oil temperature (ECT) sensor 92. The ECT sensor 92 may be located within the ICE 14 or at other locations where the coolant and/or oil is circulated, such as a radiator (not shown).

The pressure within the intake manifold 30 may be measured using a manifold absolute pressure (MAP) sensor 94. In various implementations, engine vacuum may be measured, where engine vacuum is the difference between ambient air pressure and the pressure within the intake manifold 30. The mass of air flowing into the intake manifold 30 may be measured using a mass air flow (MAF) sensor 96. The ECM 18 determines cylinder fresh air charge primarily from the MAF sensor 96 and calculates a desired fuel mass using open loop, closed loop and transient fueling algorithms. Fuel injector characterization functions convert the desired fuel mass into an injector on time, which is executed by fuel injector outputs of the ECM 18.

A throttle actuator module 98 may monitor position of the throttle valve 36 using one or more throttle position sensors (TPS) 100. The ambient temperature of air being drawn into the engine control system may be measured using an intake air temperature (IAT) sensor 101.

The ECM 18 may communicate with the TCM 24 to coordinate shifting gears in the transmission system 16. For example, the ECM 18 may reduce torque during a gear shift. The ECM 18 may communicate with a hybrid control module 102 to coordinate operation of the ICE 14 and an electric motor and/or generator (motor/generator) 104. The motor/ generator 104 may be used to: assist the ICE 14; replace the ICE 14, and start the ICE 14. The stop-start control system 12 may be a 12 volt (V) stop-start system.

The stop-start control system 12 may be a 12 volt (V) system. A 12V stop-start system may refer to a traditional powertrain system with a different starter/motor that operates on 12 volts. A 12V stop-start system includes a transmission 106 with an auxiliary pump 108 that is external to the transmission and maintains fluid pressure within the transmission 106 to maintain engagement of gear(s) and/or clutch(es). For example, a first gear may be held in an engaged state during auto-stop/start modes using the auxiliary pump 108. In various implementations, the ECM, the TCM and the hybrid control module 102 may be integrated into one or more modules.

Figure 2:
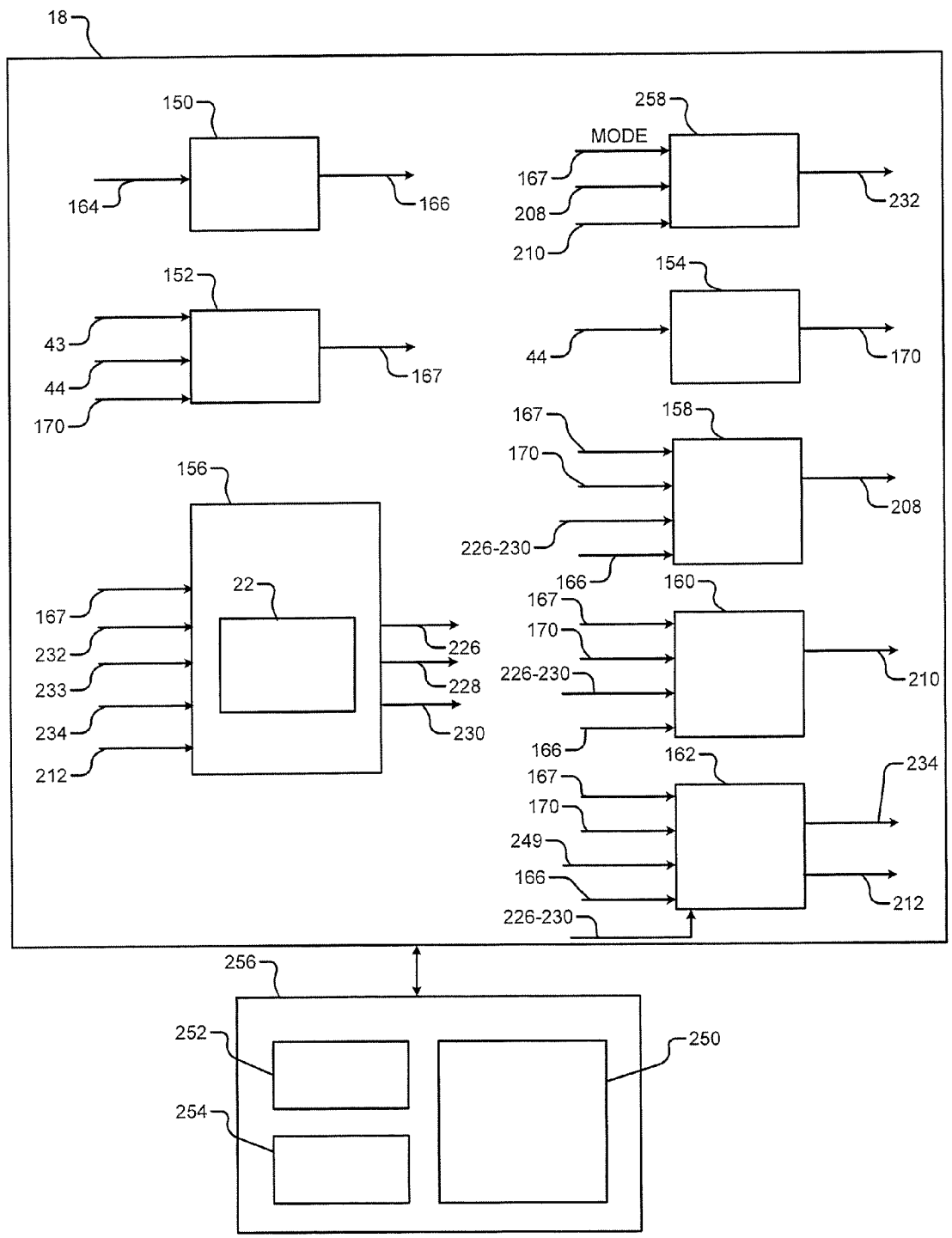
FIG. 2 is a functional block diagram of an engine control module incorporating an air charge module in accordance with the present disclosure.

Referring now also to FIG. 2, the ECM 18 is shown. The ECM 18 includes an engine position module 150, a mode selection module 152, a change of mode module 154, a cylinder monitoring module 156, a fuel control module 158, a spark control module 160 and a throttle control module 162.

The engine position module 150 determines position of the ICE 14. The position may refer to position of a crankshaft and/or camshaft of the ICE 14. The position is determined base on position sensor signals $PS_1$-$PS_N$ 164 received from, for example, the engine position and/or speed sensor(s) 90, where N is an integer greater than or equal to 1. The engine position module 150 generates an engine position signal POS1 166 (first position signal).

The mode selection module 152 determines a current operating mode of the engine system 10 and generates a mode selection signal MODE 167. The mode selection module 152 may determine the current operating mode based on the brake signal BRAKE 43, the accelerator pedal signal ACCEL 44 and a change of mode signal SWITCH 170.

Figure 5:
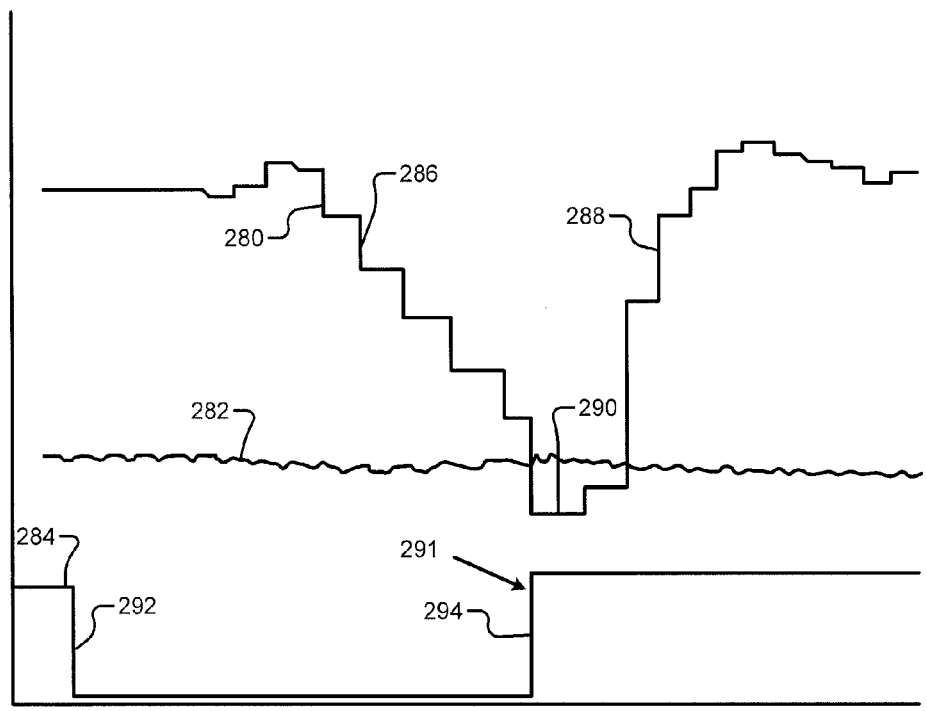
FIG. 5 is a plot illustrating a transition from the shut down phase to the startup phase in accordance with the present disclosure.

The change of mode module 154 may be part of the mode selection module 152 or may be a distinct module, as shown. The change of mode module 154 transitions the engine system 10 from the auto-stop mode to the auto-start mode without stalling the ICE 14. This transition may or may not include performing the trapped air charge adjustment mode. An example of this transition is illustrated in FIG. 5. The change of mode module 154 may generate the change of mode signal SWITCH 170 based on, for example, the accelerator pedal signal ACCEL 44. A vehicle operator may actuate the accelerator pedal during the auto-stop mode. The change of mode module 154 may interrupt the auto-stop mode and initiate the auto-start mode based on the actuation of the accelerator pedal 40.

Figure 3:
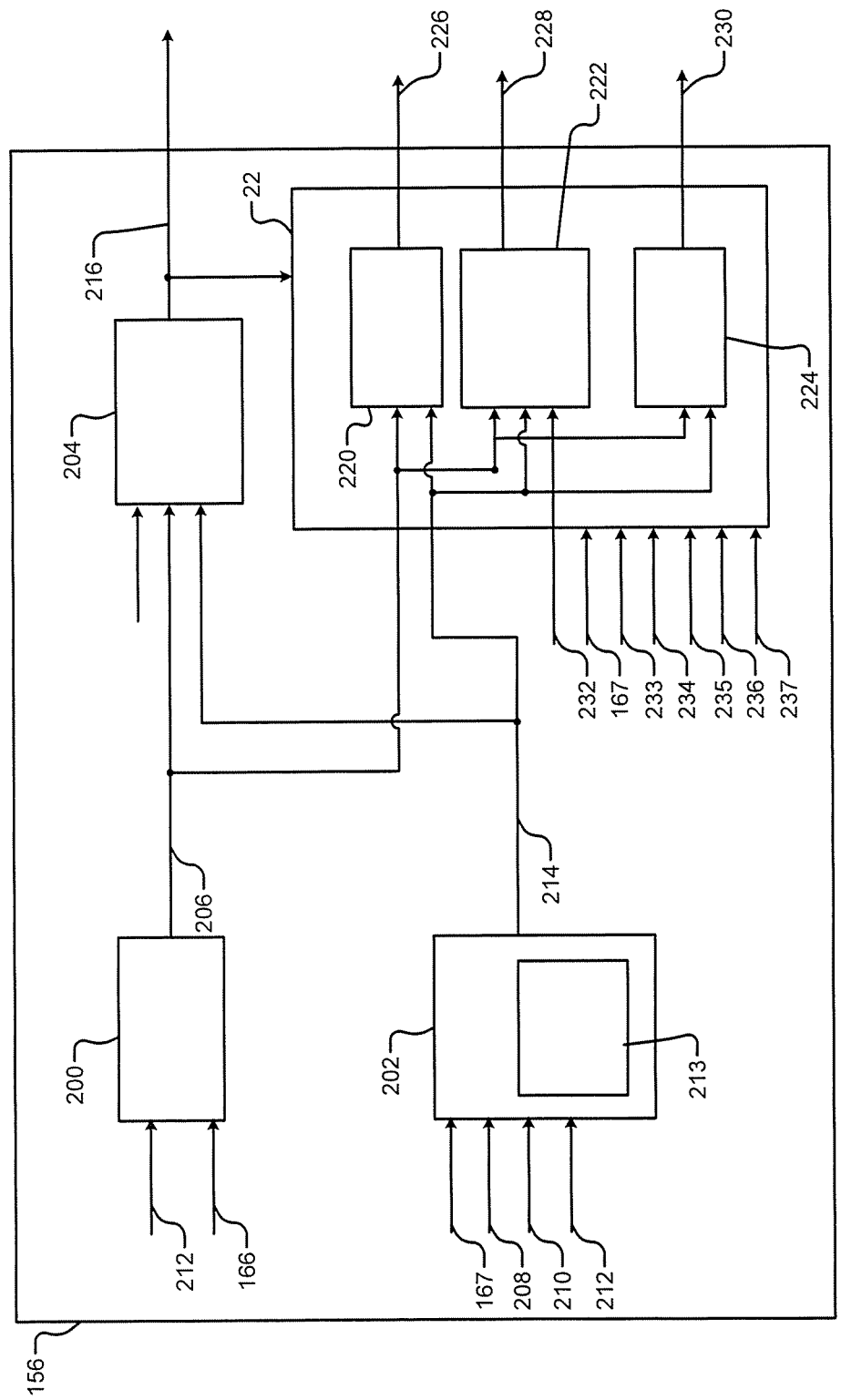
FIG. 3 is a functional block diagram of a cylinder monitoring module in accordance with the present disclosure.

Referring now also to FIG. 3, the cylinder monitoring module 156 is shown. The cylinder monitoring module 156 monitors states of each of the cylinders during the auto-stop, trapped air charge adjustment and auto-start modes. Cylinder state information for each cylinder includes: a prediction type; a number of prediction steps a cylinder of an engine is away from an intake stroke (distance from intake); a cycle type; a current piston stroke of the cylinder; states of intake and exhaust valves; etc. A prediction type may be one of a crank mode, a crank-to-run mode, a run mode, and a misfire mode. A misfire mode may refer to a period when a misfire occurs. A misfire may refer to a fuel charge within a cylinder not igniting at a proper time.

A combustion cycle may include an intake, compression, power/expansion and exhaust strokes. A combustion cycle may be divided into three steps. The first or intake step (0 step ahead) includes the end of the exhaust stroke and the intake stroke. The second step (1 step ahead) includes the exhaust stroke. The third step (2 step ahead) includes the power/expansion stroke. This is further described with respect to FIG. 7.

The cylinder monitoring module 156 includes a distance from intake module 200, a cycle type module 202, a position estimation module 204 and the air charge module 22. The distance from intake module 200 determines the number of prediction steps a cylinder of an engine is away from an intake stroke and generates a distance from intake signal DISTfromINT 206. The distance from intake signal DISTfromINT 206 may be generated based on the engine position signal POS1 166, the mode selection signal MODE 167, a fuel control signal FUEL 208, a spark control signal SPARK 210 and/or an intake stroke signal INTAKE 212. The intake stroke signal INTAKE 212 may intake start and end times of an intake stroke of a cylinder. The intake stroke signal 212 may be generated based on the engine position signal POS1 166.

The cycle type module 202 determines the number of ignitions (spark events) a cylinder has experienced from activation of the ICE 14. The number of ignitions may be counted by a spark counter 213. The cycle type module 202 indicates the cycle type information via a cycle type signal CYCTYP 214. Distance from intake and cycle type information is further described below with respect to FIG. 7. The cycle type signal CYCTYP 214 may be generated based on the engine position signal POS1 166, the spark signal SPARK 210 and/or the intake stroke signal 212.

The position estimation module 204 estimates engine position and/or piston position within each cylinder of the ICE 14. The position estimation module 204 may estimate the engine position and/or piston position based on the engine position signal POS1 166, the distance from intake signal DISTfromINT 206 and/or the cycle type signal CYCTYP 214. The position estimation module 204 generates a position estimation signal POS2 216 (second position signal).

The air charge module 22 includes a shut down module 220, a trapped air charge module 222, and a startup module 224. The shut down module 220 generates a first air charge signal 226 that indicates air masses within each of the cylinders for each engine cycle (or event) of the auto-stop mode. The trapped air charge module 222 generates a second air charge signal 228 that indicates air masses within each of the cylinders when the ICE 14 is stalled. The startup module 224 generates a third air charge signal 230 that indicates air masses within each of the cylinders for each engine cycle of the auto-start mode.

The shut down module 220, the trapped air charge module 222, and the startup module 224 may generate the air charge signals 226, 228, 230 based on, for example, the mode selection signal MODE 167, the prediction type, the distance from intake signal DISTfromINT 206, the cycle type signal CYCTYP 214, an engine off time signal EngOFF 232, a manifold absolute pressure signal MAP 233, a throttle position signal THR 234, an intake charge temperature signal ICT 235 (air temperature within the intake manifold 30), an ambient temperature signal AMB 236, and/or other signals. The other signals may, for example, include position, speed, pressure and/or temperature signals of the ICE 14. The temperature signals may include a cylinder head temperature signal, a piston temperature signal, etc.

The fuel control module 158 controls fuel injection into the cylinder(s) of the ICE 14. The fuel control module 158 may generate the fuel control signal FUEL 208 based the engine position signal POS1 166, the mode selection signal MODE 167, the change of mode signal SWITCH 170, and/or the air charge signals 226, 228, 230.

The spark control module 160 controls spark (ignition) of the cylinder(s) of the ICE 14. The spark control module 160 may generate the spark control signal SPARK 210 based the engine position signal POS1 166, the mode selection signal MODE 167, the change of mode signal SWITCH 170, and/or the air charge signals 226, 228, 230.

The throttle control module 162 controls position of one or more throttle(s) of the ICE 14. The throttle(s) may include a main throttle and/or port throttle(s). The throttle control module 162 may generate one or more throttle position signals, such as the throttle position signal THR 234 based the engine position signal POS1 166, the mode selection signal MODE 167, the change of mode signal SWITCH 170, the air charge signals 226, 228, 230, and/or throttle position sensor signals $TS_1$-$TS_M$ 249, where M is an integer greater than or equal to 1.

The air charge estimates, the distances from intake, and the cycle types determined by the modules 22, 200, 202 may be stored in respective tables 250, 252 and 254 of memory 256. This information may be accessed, for example, during the auto-start mode to estimate air masses within each of the cylinders of the ICE 14.

The ECM 18 also includes an engine off timer 258. The engine off timer monitors the amount of time that the ICE 14 is shut down. The engine off timer generates an engine off signal EngOFF based on the mode selection signal MODE, the fuel control signal FUEL and the spark control signal SPARK.

The above-described modules of FIGS. 2 and 3 may be functions performed by the ECM 18 and have associated function calls.

Figure 4:
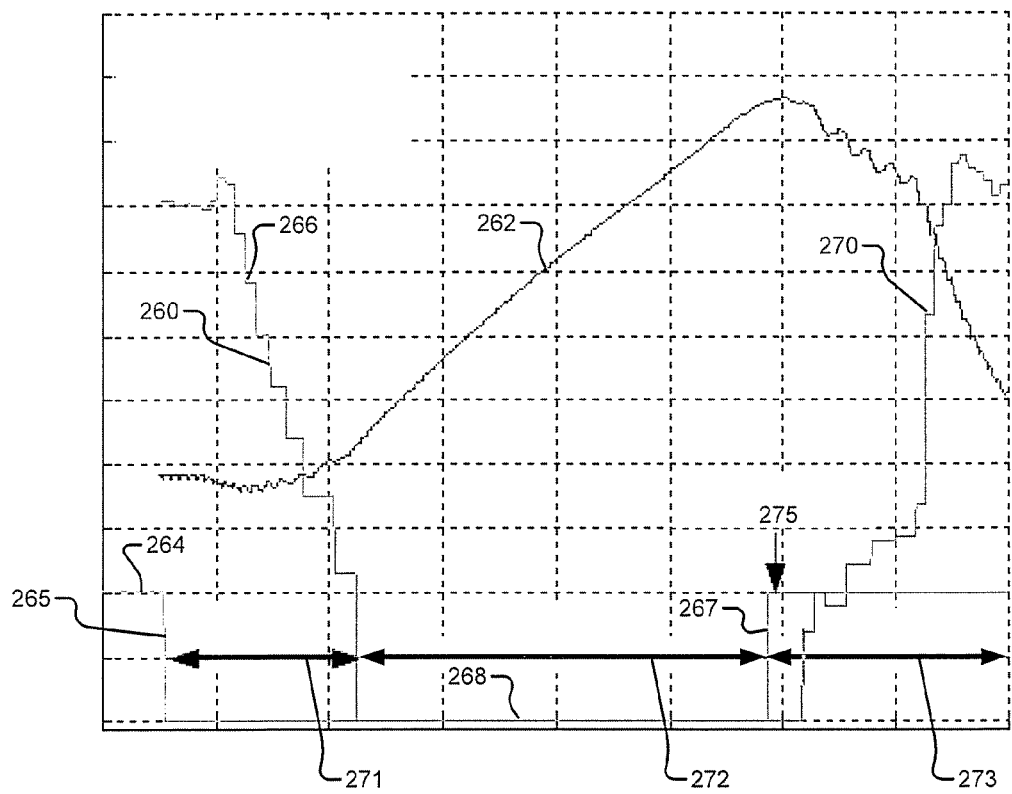
FIG. 4 is a plot illustrating shut down, stalled and startup phases of an engine in accordance with the present disclosure.

Referring now to FIGS. 2 and 4, which includes a plot illustrating shut down, stalled and auto-start phases of the ICE 14. The shut down phase is referred to as phase I (first stop-start phase). The stalled phase is referred to as phase II (second stop-start phase). The startup phase is referred to as phase III (third stop-start phase). The plot includes an engine speed signal 260, a MAP signal 262 and a control signal 264. The control signal 264 may be generated, for example, by the ECM 18 and indicate shut down and startup of the ICE 14. The control signal may have, for example, a HIGH state and a LOW state. The HIGH state indicates that the ICE 14 is activated. The LOW state indicates that the ICE 14 is being shut down. Initiation of engine shut down occurs at 265 and initiation of engine startup occurs at 267.

The engine speed signal includes a ramp down portion 266, a stalled portion 268 and a ramp up portion 270. The engine speed, as shown, is: ramped down during phase I (271); equal to 0 RPM during phase II (272); and ramped up during phase III (273). The MAP signal 262 may be stable or at a constant pressure during phase I. The MAP signal 262 increases during phase II, since air from the manifold is no longer being injected into the cylinders. The intake and exhaust valves may be inactive or maintained in a closed state during phase II. Air within the manifold 30 may be circulated back to the atmosphere or environment surrounding the vehicle during phase II. The MAP signal 262 may decrease from a peak level during phase II to near or at a steady-state level for idle control during phase III.

Trapped air charge estimates may be updated prior to and/or at the beginning of phase III and/or during the trapped air charge adjustment mode. An example of when the trapped air charge estimates are updated is identified by arrow 275. The ICE 14 is stalled and/or pistons of the engine are not moving during the trapped air charge adjustment mode. The trapped air charge module 222 updates trapped air charge estimates to allow for accurate fueling and spark timing of charged cylinder(s). This may be done using a system model, tables, and/or corresponding equations for lookup and/or dynamic-based estimations. Fuel and spark parameters for each cylinder may be adjusted based on the amount of trapped air within each of the cylinders. Fuel and spark is provided to each cylinder during a first ignition cycle of the ICE 14 according to the fuel and spark parameters. An ignition cycle refers a one or more spark(s) provided to a cylinder during a combustion cycle.

During phase I, the engine is shut down, throttle position is adjusted to reduce engine vibration (choking of engine is controlled), and the transmission system 16 may initiate an auto-stop/start mode. In the auto-stop/start mode, engine engaging clutch(es) of the transmission system 16 may be disengaged. One or more gears of the transmission system 16 may be engaged while in the auto-stop/start mode.

Engine position information from the engine position and/or speed sensor(s) 90 is available when the engine is not stalled or during phases I and III. For this reason, during phases I and III the engine position module 150 may generate position triggers to determine position of the ICE 14. Engine position information collected from the engine position sensor(s) 90 during phase I may be used, for example by the position estimation module 204, to estimate position of the engine during phase II.

In FIG. 5, a plot illustrating a transition from the auto-stop mode (phase) to the auto-start mode (phase) is shown. The plot includes an engine speed signal 280, a MAP signal 282 and a control signal 284. The engine speed signal 280 includes a ramp down portion 286 and a ramp up portion 288. Since there is a transition from the auto-stop mode to the auto-start mode, the minimum engine speed 290 is not 0 rev/s, but rather is greater than 0 rev/s. The minimum engine speed 290 depends on when a change of mode signal is generated during the auto-stop mode. An example of when the change of mode signal is generated identified by arrow 291.

The control signal illustrates an initiation of engine shut down at 292 and an initiation of engine startup at 294. The MAP signal 282 is near a steady-state level, as the engine is not stalled.

Figure 6:
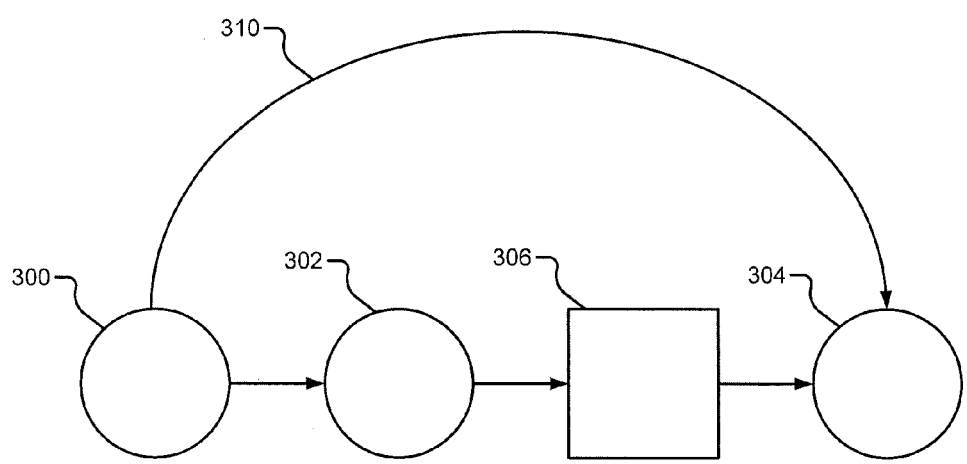
FIG. 6 is a phase diagram in accordance with the present disclosure.

In FIG. 6, a phase diagram is shown. The phase diagram illustrates an example implementation between the above described phases of FIGS. 4 and 5. The phase diagram includes phases I-III, designated 300, 302 and 304, and the trapped air adjustment mode, designated 306. Phase I includes performing an engine shut down. Phase II may be performed after phase I and includes stalling of an engine. The trapped air charge adjustment mode may be performed at the end of phase II, at the beginning of phase III and/or between phases I and III, as shown. The trapped air adjustment mode includes estimating and/or updating air charge values for each of the cylinders with trapped air. Phase III includes starting the engine. Phase III may be performed after phase I, after phase II and/or after the trapped air charge adjustment mode. A change of mode signal 310 is shown to illustrate a transition from phase I directly to phase III without performing phase II and/or the trapped air charge adjustment mode.

Figure 7:
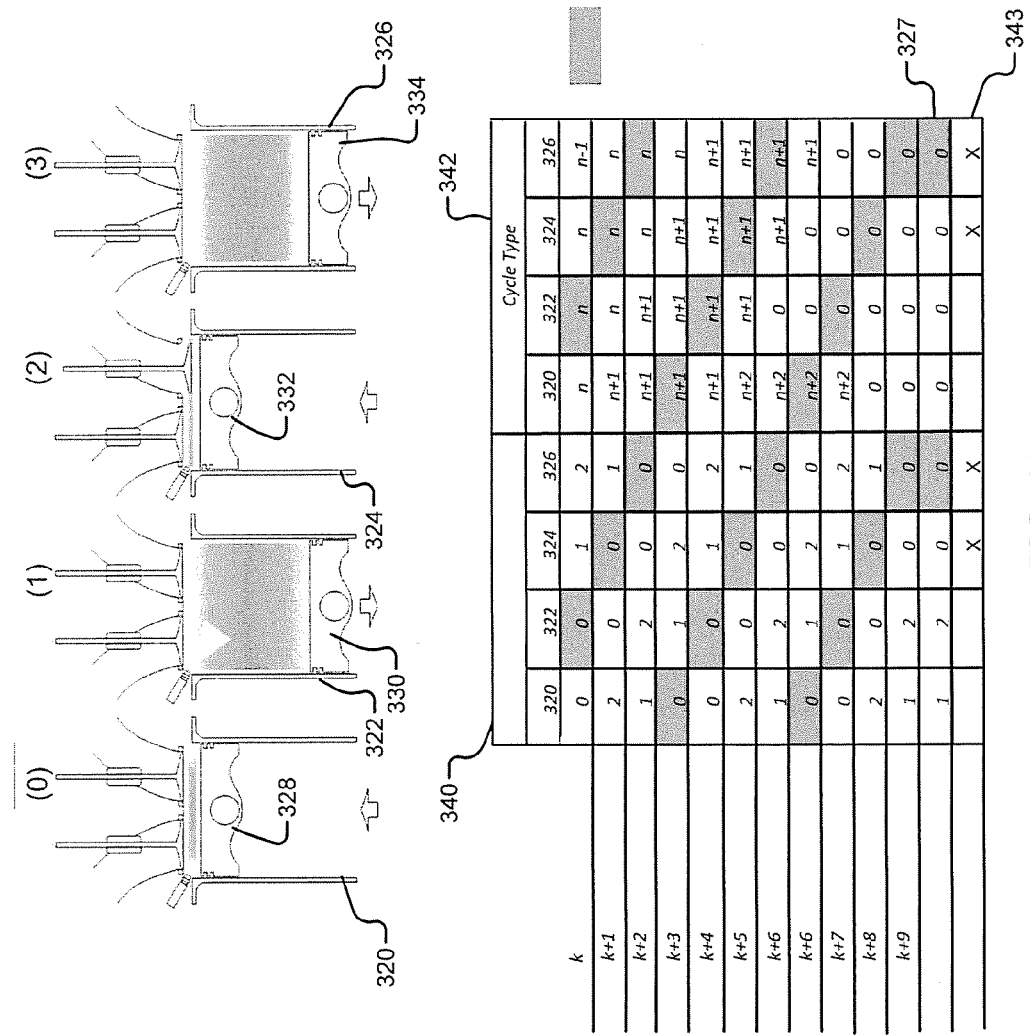
FIG. 7 is an intake distance and cycle type diagram in accordance with the present disclosure.

Referring now to FIGS. 3 and 7, an intake distance and cycle type diagram is shown in FIG. 7 for an engine auto-stop mode. Four cylinders 320, 322, 324, 326 of an engine are shown. Each of the cylinders 320, 322, 324, 326 is in a different stroke state and has respective pistons 328, 330, 332, 334. The first cylinder 320 is shown at the end of a compression stroke, where the first piston 328 is at a top dead center (TDC) position (farthest piston position from the crankshaft 50). The second cylinder 322 is shown at the end of an intake stroke, where the second piston 330 is at a bottom dead center (BDC) position (closest piston position to the crankshaft 50). The second cylinder 322 is shown having a full air charge. The third cylinder 324 is shown at the end of an exhaust stroke, where the third piston 332 is at a TDC position. The fourth cylinder 326 is shown at the end of a power/expansion stoke or beginning of an exhaust stroke, where the fourth piston 334 is at a BDC position.

A table that includes prediction steps or distances from an intake stroke and cycle types are shown. The number of prediction steps (M) is based on the number of cylinders (N) in the engine 12. For example, an N-cylinder engine has up to N−1 prediction steps. The distances from intake phases and cycle types are provided for each engine cycle or cylinder event. A cylinder event may refer to a stroke, an ignition event, and/or a predetermined amount of crankshaft rotation (e.g., 180° for a 4-cylinder engine). A crankshaft of a 4-cylinder engine rotates 720° to complete a combustion cycle. Events from k to k+9 are shown, where k is an integer.

The table includes a distance from intake table 340 and a cycle type table 342. The distance from intake module 200 and the cycle type module 202 may generate the entries in the tables 340, 342. The distance from intake table 340 includes distances from an intake stroke for each of the cylinders and for each of the cylinder events k through k+9. The distances of each of the cylinders may be 0 step ahead, 1 step ahead or 2 step ahead. "0 step ahead" refers to the current state of a cylinder being at the beginning, middle or end of an intake stroke. "1 step ahead" refers to a current state of a cylinder being in an exhaust stroke (or 1 stroke before an intake stroke). "2 step ahead" refers to a current state of a cylinder being in a power/expansion stroke (or 2 strokes before an intake stroke). Cylinders 320 and 322 as shown are in a 0 step ahead state. Cylinder 324 is shown in a 1 ahead state. Cylinder 326 is shown in a 2 ahead state. The shown states of the cylinders 320, 322, 324, 326 represent events k, k+4, and k+7.

An engine OFF signal may be generated at, for example, event k+6 to initiate shut down of the engine. The engine may be stalled after event k+9 (row 327). Distances from an intake phase may remain constant after event k+9 and until startup of the engine. The engine may be started after event k+9. A trapped estimation of air charges within each of the cylinders may be adjusted after event k+9. For the example shown, cylinders 324, 326 have trapped air after event k+9. Estimates of the air masses within the cylinders 324, 326 may be adjusted based on the amount of time that the engine is stalled.

The cycle type table 342 includes the number of firing events (spark events) after startup of the engine for each of the cylinders 320, 322, 324, 326. n refers to a number of engine cycles (strokes) and x identifies the firing event after the last restart of the engine, where n is an integer greater than or equal to 1 and x is an integer. For example, n refers to a first firing event, n+x, where x=1 refers to a second firing event. n+x, where x=2 refers to a third firing event. n+x, where x=−1 refers to an event prior to the first firing event. A 0 is provided as a table entry when fuel and/or spark of a cylinder are deactivated. A cylinder that is experiencing a first firing event may have a fresh air charge or a trapped air charge. A cylinder that is experiencing a second firing event may have residual elements remaining in the cylinder from a previous combustion cycles. The cycle type module 202 accounts for different levels of residual elements within each cylinder.

The tables 340 and 342 also indicate examples of when air estimation events and charge hold events may occur. An air estimation event refers to estimating air mass within a cylinder and may be estimated, for example, at the end of an intake stroke or BDC position of an intake stroke. This is shown by the second cylinder 322. Charge hold event refers to when an air mass within a cylinder is maintained. Charge estimation adjustment for certain cylinders may be performed after the engine is stalled as indicated by row 343. X indicates cylinders in the example shown for which charge estimation adjustment is performed. The adjustment may be performed due to trapped air within the identified cylinders.

Figure 8:
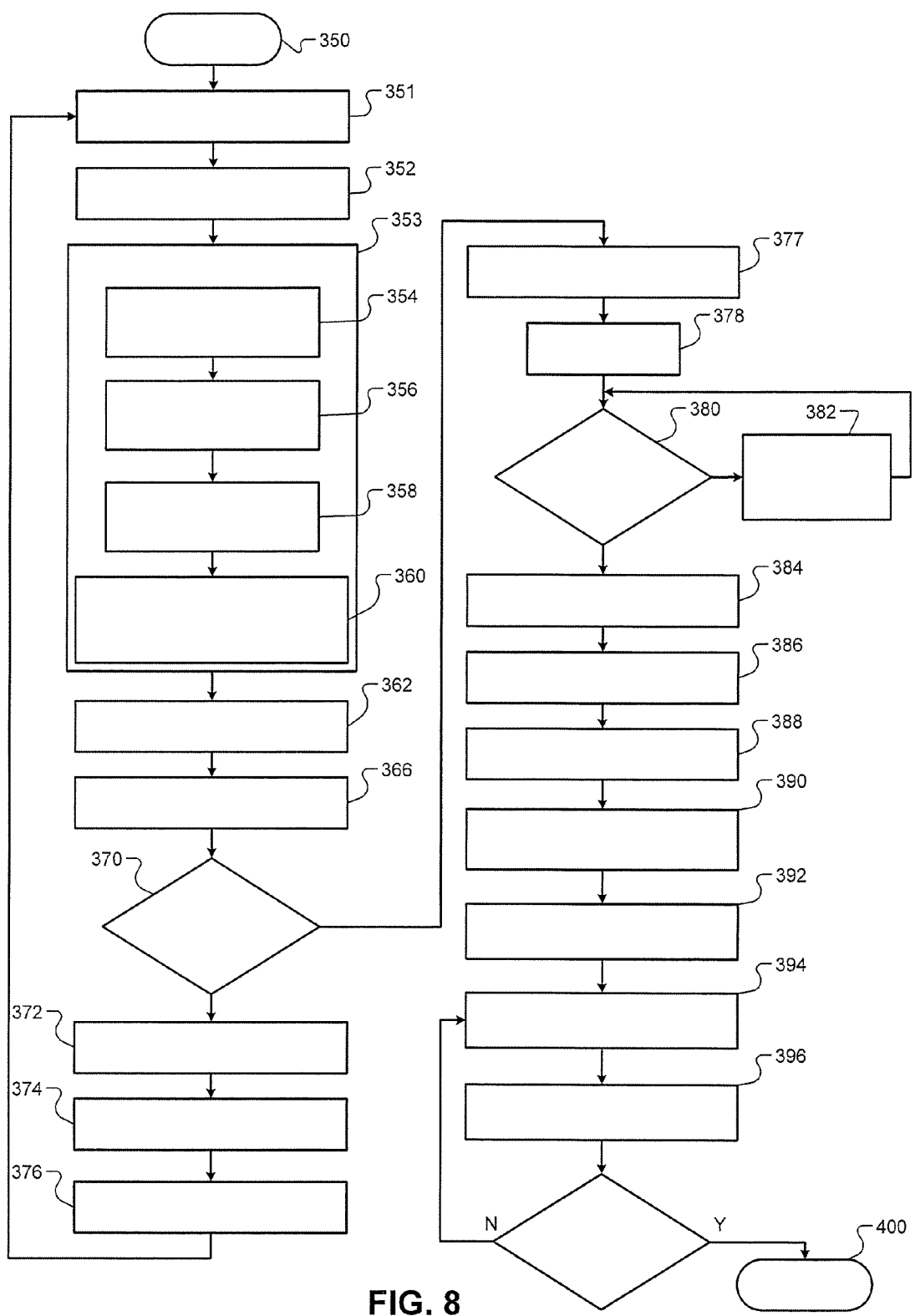
FIG. 8 illustrates a method of operating a stop-start engine control system in accordance with the present disclosure.

In FIG. 8, a method of operating a stop-start engine control system is shown. Although the method is described primarily with respect to the embodiments of FIGS. 1-7, the method may be applied to other embodiments of the present disclosure. The tasks of the method may be iteratively performed. The method may begin at 350.

At 351, sensor signals are generated. The sensor signals may be signals from, for example, sensors 41, 42, 90-100. The sensor signals may include position signals, speed signals, pressure signals and/or temperature signals. At 352, the engine position signal POS1 is generated based on position sensor signals, such as the position sensor signals $PS_1$-$PS_N$.

At 353, states of the cylinders of the ICE 14 are monitored. At 354, the cylinder monitoring module and/or the distance from intake module 200 determines the prediction type and the number of prediction steps away from an intake stroke for each of the cylinders. At 356, the cycle type module 202 determines the cycle types for each of the cylinders. The information determined at 354 and 356 may be stored in the memory 250.

At 358, the position estimation module 204 estimates an engine position and/or piston positions. The estimates may be based on the information obtained at 352, 354 and 356. At 360, the air charge module 22 monitors, estimates and/or updates estimates of air masses within each of the cylinders for each engine cycle during the auto-stop mode. The air masses may be estimated as described with respect to FIG. 3.

At 362, the ECM 18 may initiate the auto-stop mode if not already initiated. The auto-stop mode may be initiated when brakes of the vehicle are being applied. This may be detected via the brake sensor 41. The auto-stop mode may also be initiated when: speed of the ICE 14 is less than a first predetermined value; torque output requested of the ICE 14 is less than a second predetermined value; the ICE 14 has operated in an idle state for longer than a predetermined period; etc. At 366, the ECM 18 operates in the auto-stop mode and decreases (ramps down) speed of the ICE 14.

At 370, the mode selection module 152 determines whether the change of mode signal SWITCH is generated. The mode selection module 152 switches to the auto-start mode when the change of mode signal SWITCH is generated and proceeds to 372. The ECM 18 proceeds to 377 when a change of mode signal SWITCH is not generated.

At 372, the fuel control module 158 for one or more cylinder(s) generates the fuel control signal FUEL based on the estimated air mass(es) for each of the cylinder(s) and one or more engine state variables. The engine state variables may include, for example: engine temperatures (e.g., coolant, oil, cylinder head, piston, and manifold and cylinder air temperatures); engine air pressures (e.g., intake manifold, runner, and cylinder air pressures); engine positions (e.g., piston, crankshaft, camshaft, and phaser positions); etc. At 374, the spark control module 160 for the cylinder(s) generates the spark control signal SPARK based on the estimated air mass(es) for each of the cylinder(s) and one or more of the engine state variables.

The fuel control signal FUEL may include fuel parameters, such as fuel duration, fuel flow, fuel pressure, fuel timing information, etc. The spark control signal SPARK may include spark parameters, such as spark timing information, current and/or voltage information for an ignition event, number of sparks (firings) for a combustion cycle, etc. At 376, fuel and spark are provided to the cylinder(s) according to the fuel control signal FUEL and the spark control signal SPARK. The ECM 18 returns to task 353 after task 376.

At 377, fuel and spark of the ICE 14 is deactivated. The fuel and spark to each of the cylinders may be deactivated simultaneously or sequentially. Simultaneous deactivation refers to the fuel and spark to all of the cylinders being deactivated within the same period of time. Sequential deactivation refers to a one-at-a-time deactivation, for example, in the order in which the cylinders are fueled and/or sparked. Although fuel and spark are shown as being deactivated when a change of mode signal is not generated, the fuel and spark may be deactivated when a change of mode signal has been generated. Fuel and spark may be generated any time during tasks 352-376. The engine off timer 258 may be initiated, for example, when the fuel and/or spark are deactivated.

At 378, the engine is stalled. The speed of the engine is equal to 0 rev/s. At 380, when an auto-start mode request signal is generated task 384 is performed, otherwise task 382 is performed. The auto-start mode request signal may be generated based on the accelerator signal ACCEL.

At 382, the trapped air charge module 222 estimates and/or updates the estimates of trapped air mass within each of the cylinders. The estimates are based on the engine off signal EngOFF and other parameter signals, such as that received by the air charge module 22 shown in FIG. 3.

At 384, the trapped air charge module 222 estimates and/or updates the estimates of trapped air mass within each of the cylinders. At 386, the fuel control module 158 generates the fuel control signal based on the trapped air mass(es) determined at 384 and one or more of the engine state variables. At 388, the spark control module 160 generates the spark control signal based on the trapped air mass(es) determined at 384 and one or more of the engine state variables.

At 390, fuel and spark is activated and provided to one or more cylinder(s) with a trapped air mass. The fuel and spark are activated according to the fuel control signal FUEL and the spark control signal SPARK generated at 386, 388. At 392, fuel and spark to the remainder of the cylinders is activated.

At 394, speed of the engine is increased (ramped up). At 396, the cylinder monitoring module 156 may track and/or update: prediction types; estimates of distances from an intake stroke; cycle types; and engine positions and/or piston positions for each engine cycle during the auto-start mode. The air charge module 22 may monitor, estimate and/or update estimates of air masses within each of the cylinders for each engine cycle during the auto-start mode.

At 398, the ECM 18 determines whether the speed of the ICE 14 is equal to a predetermined idle speed. The ECM 18 returns to task 394 when the speed of the ICE 14 is less than the predetermined idle speed. The method may end at 400 when the speed of the ICE 14 is equal to the predetermined idle speed or continue for speeds greater than the idle speed.

The above-described tasks are meant to be illustrative examples; the tasks may be performed sequentially, synchronously, simultaneously, continuously, during overlapping time periods or in a different order depending upon the application.

The above-described embodiments reduce emissions by estimating the air masses within each cylinder of an engine and for each engine cycle. The embodiments also reduce startup variations and minimize system calibrations and/or reduce time to perform system calibrations. The embodiments provide quicker engine starts after shut down by allowing partially charged cylinders to be fueled and sparked upon startup and/or cylinder activation.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system comprising:
a first module that determines a cylinder of an engine to be in one of M prediction types and generates a distance from intake signal indicating a number of prediction steps the cylinder is away from an intake stroke, where M is an integer greater than or equal to 3;
a second module that determines a cycle type of the cylinder, wherein the cycle type indicates a number of combustion cycles the cylinder has experienced from a last restart of the engine; and
a cylinder air charge module that estimates an air mass within the cylinder based on the distance from intake signal and the cycle type.

2. The engine system of claim 1, wherein the prediction types comprise a crank mode, a crank-to-run mode, a run mode and a misfire mode.

3. The engine system of claim 1, wherein the prediction steps comprise:
a zero step ahead where the cylinder is in the intake stroke;
a one step ahead where the cylinder is one prediction step ahead of the intake stroke and is in an exhaust stroke; and
a two step ahead where the cylinder is two prediction steps away from the intake stroke and is in an expansion stroke.

4. The engine system of claim 1, wherein the number of prediction steps is based on a number of cylinders in the engine.

5. The engine system of claim 1, wherein the air charge module estimates the air mass at each prediction step.

6. The engine system of claim 1, wherein the cycle type indicates whether the air mass includes combustion residual matter from a previous combustion cycle.

7. The engine system of claim 1, wherein the cylinder air charge module determines the air mass based on manifold absolute pressure and intake charge temperature.

8. The engine system of claim 1, wherein the cylinder air charge module determines the air mass based on ambient air temperature, cylinder head temperature and piston temperature.

9. The engine system of claim 1, further comprising a fuel module that generates a fuel signal based on the air mass and an engine state variable.

10. The engine system of claim 1, further comprising a spark module that generates a spark signal based on the air mass and an engine state variable.

11. The engine system of claim 1, further comprising:
an engine timer that determines an amount of time that the engine is in a stalled state; and
a trapped air charge module that determines a trapped air mass within the cylinder based on the amount of time and subsequent to a shut down of the engine,
wherein the cylinder air charge module estimates the air mass within the cylinder based on the prediction type and the cycle type during the shut down of the engine.

12. The engine system of claim 11, further comprising:

a first position module that determines a position of at least one of a crankshaft and a camshaft of the engine and generates a first position signal; and a second position module that estimates a position of a piston within the cylinder of the engine and generates a second position signal, wherein the trapped air charge module determines the trapped air mass based on the first position signal and the second position signal.

13. The engine system of claim 1, further comprising:

an accelerator sensor that detects state of an accelerator and generates an accelerator signal; and a fuel module that generates a fuel signal based on the air mass and when the accelerator signal indicates actuation of the accelerator, wherein the fuel module refrains from generating the fuel signal when the accelerator signal indicates that the accelerator is not actuated.

14. The engine system of claim 13, further comprising an engine control module that operates the engine to transition from an engine auto-stop mode to an engine auto-start mode based on the accelerator signal.

15. An engine system comprising:

an engine timer that determines an amount of time that an engine is in a stalled state;

a first position module that determines a position of at least one of a crankshaft and a camshaft of an engine and generates a first position signal;

a second position module that estimates a position of a piston within a cylinder of an engine and generates a second position signal; and a trapped air charge module that determines a trapped air mass within the cylinder based on the amount of time, the first position signal and the second position signal.

16. The engine system of claim 15, wherein:
said position of the piston is between top dead center and bottom dead center; and
said trapped air mass is a partial charge.

17. The engine system of claim 16, further comprising a fuel module that generates a fuel signal based on the trapped air mass during a first ignition cycle subsequent to activation of the engine.

18. The engine system of claim 16, further comprising a spark module that generates a spark signal based on the trapped air mass during a first ignition cycle subsequent to activation of the engine.

19. The engine system of claim 16, further comprising at least one of:

a fuel module that generates a fuel signal based on the trapped air mass during a first ignition cycle subsequent to activation of the engine; and a spark module that generates a spark signal based on the trapped air mass during the first ignition cycle subsequent to activation of the engine.

20. The engine system of claim 15, wherein the trapped air charge module determines the trapped air mass based on the intake charge temperature.

21. The engine system of claim 15, wherein the trapped air charge module determines the trapped air mass based on ambient air temperature, cylinder head temperature and piston temperature.

22. The engine system of claim 15, further comprising:

a first module that determines the cylinder to be in one of M prediction types and generates a distance from intake signal indicating a number of prediction steps the cylinder is away from an intake stroke, where M is an integer greater than or equal to 3;

a second module that determines a cycle type of the cylinder, wherein the cycle type indicates a number of combustion cycles the cylinder has experienced from a last restart of the engine; and a cylinder air charge module that estimates an air mass within the cylinder based on the distance from intake signal and the cycle type.

\* \* \* \* \*